(12) United States Patent
Virtanen (10) Patent No.: US 10,570,296 B2
(45) Date of Patent: *Feb. 25, 2020

(54) SELF-HEALING POLYMER COMPOSITIONS

(71) Applicant: TESLA NANOCOATINGS, INC., Massillon, OH (US)

(72) Inventor: Jorma Antero Virtanen, Massillon, OH (US)

(73) Assignee: Tesla Nanocoatings, Inc., Massillon, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/449,668

(22) Filed: Jun. 24, 2019

(65) Prior Publication Data

US 2019/0309177 A1 Oct. 10, 2019

Related U.S. Application Data

(60) Continuation of application No. 15/992,648, filed on May 30, 2018, now Pat. No. 10,329,436, which is a
(Continued)

(51) Int. Cl.
*C08K 3/04* (2006.01)
*B82Y 40/00* (2011.01)
(Continued)

(52) U.S. Cl.
CPC .............. *C09D 5/34* (2013.01); *B82Y 30/00* (2013.01); *C08G 18/3206* (2013.01);
(Continued)

(58) Field of Classification Search
CPC . C08K 33/04; C08K 5/05; C08K 5/16; C08K 3/041; H01B 1/04; B82Y 40/00
(Continued)

(56) References Cited

U.S. PATENT DOCUMENTS 3,859,228 A 1/1975 Morishita et al.
4,324,717 A 4/1982 Layer
(Continued)

FOREIGN PATENT DOCUMENTS

EP 0 468 710 1/1992
EP 2 436 516 4/2012
(Continued)

OTHER PUBLICATIONS

Hager "Self-Healing Materials." Adv. Mater. 2010, 22, 5424-5430 (Year: 2010).*
(Continued)

*Primary Examiner* — Tri V Nguyen
(74) *Attorney, Agent, or Firm* — Daniel A. Thomson; Emerson Thomson Bennett, LLC (57) ABSTRACT

A self-healing polymer is described herein, including a first carbon nanotube filled with at least a first healing agent, wherein the first carbon nanotube has first and second ends, wherein a first end cap is closed on the first end of the first carbon nanotube and a second end cap is closed on the second end of the first carbon nanotube, and a second carbon nanotube filled with at least a second healing agent, wherein the second carbon nanotube has first and second ends, wherein a first end cap is closed on the first end of the second carbon nanotube and a second end cap is closed on the second end of the second carbon nanotube.

19 Claims, 3 Drawing Sheets

Related U.S. Application Data continuation-in-part of application No. 15/938,016, filed on Mar. 28, 2018, now Pat. No. 10,167,398, which is a continuation of application No. 15/070,052, filed on Mar. 15, 2016, now Pat. No. 9,982,145, which is a division of application No. 13/423,479, filed on Mar. 19, 2012, now Pat. No. 9,303,171.

(51) Int. Cl.

| | | |
|---|---|---|
| H01B 1/04 | (2006.01) | |
| C09D 5/34 | (2006.01) | |
| C09D 5/08 | (2006.01) | |
| B82Y 30/00 | (2011.01) | |
| C09D 7/40 | (2018.01) | |
| C09D 7/63 | (2018.01) | |
| C09D 175/04 | (2006.01) | |
| C08G 18/76 | (2006.01) | |
| C08G 18/32 | (2006.01) | |

(52) U.S. Cl.
CPC .......... *C08G 18/7614* (2013.01); *C08K 3/041* (2017.05); *C09D 5/08* (2013.01); *C09D 7/63* (2018.01); *C09D 7/67* (2018.01); *C09D 7/70* (2018.01); *C09D 175/04* (2013.01)

(58) Field of Classification Search
USPC ................ 252/500, 510, 511, 182.2, 182.23; 977/842, 848, 895, 897
See application file for complete search history.

(56) References Cited

U.S. PATENT DOCUMENTS

| | | | |
|---|---|---|---|
| 4,463,118 A | 7/1984 | Evans et al. | |
| 4,526,813 A | 7/1985 | Wu | |
| 4,767,829 A | 8/1988 | Kordomenos et al. | |
| 4,895,702 A | 1/1990 | Fischer | |
| 5,071,706 A | 12/1991 | Soper | |
| 5,589,523 A | 12/1996 | Sawaoka et al. | |
| 6,020,385 A | 2/2000 | Halle et al. | |
| 6,184,280 B1 | 2/2001 | Shibuta | |
| 6,235,856 B1 | 5/2001 | Hafner et al. | |
| 6,261,871 B1 | 7/2001 | Langari et al. | |
| 6,287,372 B1 | 9/2001 | Briand et al. | |
| 6,375,872 B1 | 4/2002 | Chao | |
| 6,479,167 B2 | 11/2002 | Sumita et al. | |
| 6,486,099 B2 | 11/2002 | Igari et al. | |
| 6,500,564 B1 | 12/2002 | Shiobara et al. | |
| 6,518,330 B2 | 2/2003 | White et al. | |
| 6,562,474 B1 | 5/2003 | Yoshimi et al. | |
| 6,617,046 B2 | 9/2003 | Noro et al. | |
| 6,723,257 B2 | 4/2004 | Libutti et al. | |
| 6,858,659 B2 | 2/2005 | White et al. | |
| 7,045,562 B2 | 5/2006 | Thiel et al. | |
| 7,399,532 B2 | 7/2008 | Seido et al. | |
| 7,422,789 B2 | 9/2008 | Avakian et al. | |
| 7,727,420 B2 | 6/2010 | Ward | |
| 7,794,626 B2 | 9/2010 | Horton | |
| 7,851,022 B2 | 12/2010 | Schwarz | |
| 8,993,066 B2 | 3/2015 | Yang et al. | |
| 9,303,171 B2 | 4/2016 | Virtanen | |
| 9,982,145 B2 | 5/2018 | Virtanen | |
| 10,329,436 B2 | 6/2019 | Virtanen | |
| 2002/0193040 A1 | 12/2002 | Zhou | |
| 2003/0060569 A1 | 3/2003 | White et al. | |
| 2003/0151030 A1 | 8/2003 | Gurin | |
| 2004/0055688 A1 | 3/2004 | Cowger et al. | |
| 2004/0076681 A1* | 4/2004 | Dennis ................ | A61K 9/0092 424/489 |
| 2004/0107866 A1 | 6/2004 | Bitzer et al. | |
| 2004/0177451 A1 | 9/2004 | Poulin et al. | |
| 2005/0038173 A1 | 2/2005 | Harris et al. | |
| 2005/0137291 A1 | 6/2005 | Schneider | |
| 2005/0224764 A1 | 10/2005 | Ma et al. | |
| 2005/0272856 A1 | 12/2005 | Cooper et al. | |
| 2006/0166003 A1 | 7/2006 | Khabashesku et al. | |
| 2007/0087198 A1 | 4/2007 | Dry | |
| 2007/0106006 A1 | 5/2007 | Cooper et al. | |
| 2007/0292459 A1 | 12/2007 | Cooper et al. | |
| 2008/0265219 A1 | 10/2008 | Whitehead et al. | |
| 2008/0292801 A1 | 11/2008 | Shah et al. | |
| 2009/0036568 A1 | 2/2009 | Merle et al. | |
| 2009/0098299 A1 | 4/2009 | Cheng | |
| 2009/0202644 A1 | 8/2009 | Gogotsi et al. | |
| 2009/0224435 A1 | 9/2009 | Gogotsi et al. | |
| 2009/0242850 A1 | 10/2009 | Park et al. | |
| 2010/0129555 A1 | 5/2010 | Huang | |
| 2010/0167088 A1 | 7/2010 | Choual et al. | |
| 2010/0255279 A1 | 10/2010 | Hong | |
| 2011/0033721 A1* | 2/2011 | Rohatgi ................ | B22D 19/14 428/548 |

FOREIGN PATENT DOCUMENTS

| | | | | |
|---|---|---|---|---|
| KR | 20090043726 A | * | 5/2009 | ............... C08K 3/04 |
| WO | 2003 060 035 | | 7/2003 | |
| WO | 2010 062 002 | | 6/2010 | |
| WO | 2010 137 726 | | 12/2010 | |
| WO | 2011 127 315 | | 10/2011 | |

OTHER PUBLICATIONS

Naguib, "Filing and Chemical Modification of Carbon Nanotubes with Polymers," Sep. 7-11, 2003, Paper 490 presented at the 226th ACS National Meeting.
US Dept of Health and Human Services, "Occupational Safety and Health Guideline for Ethylidene Norbornene," Public Health Service, Centers for Disease Control and Prevention, National Institute for Occupational Safety and Health Education and Information Division, Ethylidene Norbornene, 1995, pp. 1-8.
3M Electronics Markets Materials Division, "3M Fluorinert Liquids for Electronics Manufacturing," Issued Dec. 3, 2003, pp. 1-4, 3M Center, Bldg 220-9E-11, St. Paul, MN 55144-1000 www.3m.com/electronics/chemicals.
Lee, et al., "Characterization of Dicyclopentadiene and 5-Ethylidene-2-norbornene as Self-Healing Agents for Polymer Composite and its Microcapsules," Macromolecular Research, vol. 12, No. 5, p. 478-483, 2004.
Unknown, O=CHem, Solvents, Apr. 19, 2012, http://web1.uct.usm.maine.edu/~newton/Chy251_253/Lectures/Solvents/Solvents.html, Solvents, p. 1-4.
White, et al., "Autonomic Healing of Polymer Composites," Feb. 15, 2001, p. 794, Nature vol. 409 www.nature.com.
Brown, et al., "In Situ Poly (urea-formaldehyde) Microencapsulation of Dicyclopentadiene," p. 1-14, Journal of Microencapsulation, (2003).
Brown, et al., "Fracture and Fatigue Behavior of Self-Healing Polymer Composite," p. C11.22.1-6, Mat. Res. Soc. Symp. Proc., vol. 735 2003 Materials Research Society.
Kessler, et al., "Self-Healing Structural Composite Materials," 2003, Elsevier, p. 743-753, Part A-34 www.sciencedirect.com.
Lvov, et al. "Halloysite Clay Nanotubes for Controlled Release of Protective Agents," ACSNano, online May 27, 2008, vol. 2, No. 5, p. 814-820 www.ascnano.org.
Sakurai, "Polymeric Materials having Autonomic Healing Properties," Kagaku to Kogyo, CAPLUS Accession No. 2002; 175108, 2001, vol. 54, No. 11, Abstract, Unable to obtain article.
Xu, "1D Lanthanide Halide Crystals Inserted into Single-Walled Carbon Nanotubes," Chem. Commun., 2427-2428, 2000.
Carfagna, et al., "The Effect of the Prepolymer Composition of Amino-Hardened Epoxy Resins on the Water Sorption Behavior and Plasticization," Journal of Applied Polymer Science, vol. 27, 105-112, 1982.
Steel, "Hawley's Condensed Chemical Dictionary," 1177, 2007.
Berry, et al., "Lignosulfonic Acid-Doped Polyaniline—a Versatile Conducting Polymer," Chemical Modification, Properties and Usage of Lignin, 21-40, 2002.

(56) References Cited

OTHER PUBLICATIONS

International Search Authority, "PCT International Search Report and Written Opinion," International Application No. PCT/US2012/053389, dated Jun. 3, 2013.
Sastri, "Green Corrosion Inhibitors, Theory and Practice." John Wiley & Sons, Inc., New Jersey, 2011 See Attachments 8 through 18.
Lanzara, "Carbon Nanotube Reservoirs for Self-Healing Materials," Nanotechnology 20, 335704, 7 pp, 2009.
Syrett, "Self-Healing and Self-Mendable Polymers," Polym. Chem., 1, 978-987, 2010.

* cited by examiner

SELF-HEALING POLYMER COMPOSITIONS

This application is a continuation of U.S. Ser. No. 15/992,648, filed May 30, 2018, now U.S. Pat. No. 10,329,436, which is a continuation-in-part of U.S. Ser. No. 15/938,016, filed Mar. 28, 2018, now U.S. Pat. No. 10,167,398, which is a continuation of U.S. Ser. No. 15/070,052, filed Mar. 15, 2016, now U.S. Pat. No. 9,982,145, which is a divisional of U.S. Ser. No. 13/423,479, filed Mar. 19, 2012, now U.S. Pat. No. 9,303,171 which claims priority to the provisional application under U.S. Ser. No. 61/451,131, entitled SELF-HEALING POLYMER COMPOSITIONS, filed Mar. 18, 2011, which is incorporated herein by reference.

BACKGROUND

This present teaching pertains to a composition that can be used to heal cracks in plastics and other substrates. This present teaching also pertains to a method of preparing a composition for healing cracks in plastics and other substrates.

DESCRIPTION OF THE RELATED ART

Cracks are detrimental to plastics, rubber, ceramics, coatings, metals, and/or concrete. Cracking may range from merely cosmetic to detrimental. The mechanisms behind cracking may vary from stress, fatigue, mechanical degradation, environmental factors, chemical factors, and several others. When a susceptible material is subjected to at least one of these mechanisms, cracking may occur. Because of the wide range of these mechanisms, it may be difficult to anticipate and address the cracking before it is apparent.

Cracks are first nanosized, and visually unobservable. Gradually, they will get larger. Crack formation may decrease the strength of a material. The cracks may then lead to deeper cracks and even corrosion issues. Crack formation may also diminish the corrosion prevention of a material. Besides the damaging effects of cracks, they are also visually undesirable. Despite quality materials, cracks will eventually be formed.

What is needed is a way to repair cracking once is has occurred without compromising the integrity of the material. Ideally, what is needed is a composition in which the material can self-heal before cracks may be visually detected. The present teaching provides a composition that can be used to heal cracks and a method for the preparation of the composition.

SUMMARY

Accordingly, it is an object of the present teaching to provide a composition for healing cracks in a substrate comprising nanotubes; at least one healing agent inside the nanotubes; and end caps bound onto both ends of the nanotubes.

One object of the present teaching is that cracks may be healed for a substrate comprised of plastic, rubber, ceramic, coating, metal, and/or concrete.

Another object of the present teaching is that the nanotube comprises carbon nanotubes.

Yet another object of the present teaching is that the carbon nanotubes are single walled, double walled, and/or multiwalled.

Still another object of the present teaching is that the carbon nanotubes are functionalized.

Still yet another object of the present teaching is that the nanotube comprises inorganic nanotubes.

One object of the present teaching is that at least one healing agent is released from the nanotubes for filling cracks in a substrate.

Another object of the present teaching is that a healing agent comprises diisocyanates, polyisocyanates, dialcohols, and/or polyalcohols.

Yet another object of the present teaching is that a healing agent is liquid.

Still another object of the present teaching is that the healing groups of at least one healing agent are chemically protected.

Still yet another object of the present teaching is that end caps comprise polymers and/or nanoparticles.

Another object of the present teaching is that end caps comprise polyallylamine, polylysine, aminodendrimer, aminofunctionalized polystyrene, and/or polyacrylate nanoparticles.

One object of the present teaching is that it provides a means for removing the end caps and releasing the healing agent(s).

Another object of the present teaching is that it provides a means for filling cracks in a substrate.

Another object of the present teaching is that it further comprises silicon carbide whiskers.

Still another object of the present teaching is that it further comprises graphite fiber.

Still yet another object of the present teaching is that it further comprises nanoparticles.

Yet another object of the present teaching is that it further comprises nanoparticles with zinc, aluminum, magnesium, and/or silver.

One object of the present teaching is a method for producing the composition for healing cracks comprising nanotubes, healing agent(s) inside the nanotubes, and end caps bound onto both ends of the nanotubes. The method comprises the steps of filling nanotubes with healing agent(s) and binding end caps onto both ends of the nanotubes wherein the healing agent(s) is released from the nanotubes for filling cracks in a substrate.

Still another object of the present teaching further comprises filling the healing agent(s) inside the nanotubes under vacuum.

Yet another object of the present teaching further comprises removing the end caps and releasing the healing agent(s).

Still yet another object of the present teaching is that the end caps are removed by a hydrolysis reaction.

Another object of the present teaching is the self-healing of cracks in plastic, rubber, ceramic, coating, metal, and/or concrete.

Still another object of the present teaching is that it is easy to incorporate into a substrate.

The present teaching provides compositions and methods for efficient self-healing of cracks in plastics.

In another aspect the healing agent is encapsulated into CNTs that have been subsequently end-capped.

In another aspect healing agents are polyfunctional alcohols and isocyanates. Advantageously, polyalcohol is protected so that it will react only after protecting groups have been removed, for instance, by hydrolysis.

It is a further aspect of the present teaching that healing agent(s) consist mainly of functionalized nanoparticles.

Still other benefits and advantages of the present teaching will become apparent to those skilled in the art to which it pertains upon a reading and understanding of the following detailed specification.

BRIEF DESCRIPTION OF THE DRAWINGS

The present subject matter may take physical form in certain parts and arrangement of parts, embodiments of which will be described in detail in this specification and illustrated in the accompanying drawings which form a part hereof and wherein.

DETAILED DESCRIPTION

Referring now to the drawings wherein the showings are for purposes of illustrating aspects of the present teaching only and not for purposes of limiting the same, and wherein like reference numerals are understood to refer to like components, provided is a self-healing polymer composition.

Figure 1:
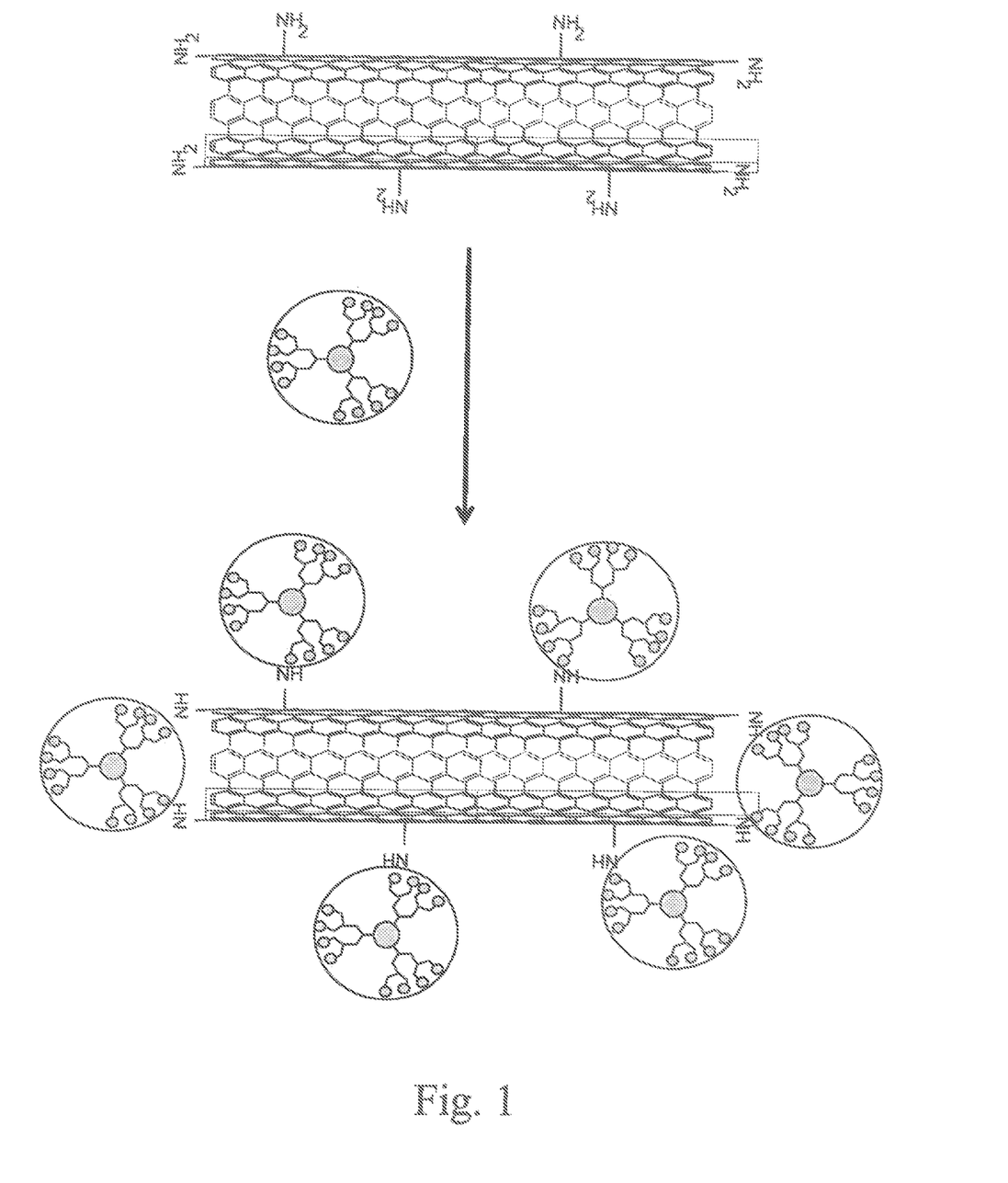
FIG. 1 is a schematic representation of preparing a composition for healing cracks in plastics and other substrates.

FIG. 1 shows a process for making a chemical composition for healing cracks comprising of nanotubes, at least one healing agent inside the nanotubes, and end caps, which are bound onto both ends of the nanotubes. With the chemical composition for healing cracks, the healing agent(s) can be released from the nanotubes in order to fill the cracks of various substrates. The healing agent(s) may then be released after a reaction to remove the end caps has occurred.

Crack formation may be prevented, at least partially, by mixing strong nanofibers into a plastic or other substrate. The compositions presented herein may fill these cracks and provide barrier protection against water and/or oxygen, which may further propagate the cracks. These nanofibers may provide a means to release chemical compositions which may self-heal various substrates when cracks begin to occur. These substrates may include plastics, rubber, coatings, ceramics, metals, and/or concrete. The substrate may be structural or used as a coating. If the substrate is a plastic, it may be thermoplastic or thermoset. If it is a coating, the compositions described herein may be used in more demanding coatings applications such as oil pipes, chemical containers, and/or marine applications. With the application in coatings, the coating formulation may contain sacrificial metal particles such as zinc and/or nickel as anticorrosive agents. Nanofibers may include carbon nanotubes (CNTs) and/or inorganic nanotubes (INTs). These nanofibers provide a vessel in which the healing agent may be held until they are needed to fill these crack in the substrate.

The CNTs may be single walled, double walled, or multiwalled in their layers. Among the CNTs, the multiwalled nanotubes may have a larger volume, which may help them to hold more of the healing agents. The single walled CNTs may hold less healing agent than the multiwalled CNTs. These CNTs may have excellent strength, hardness, kinetic properties, and thermal properties. CNTs can also have different chiralities and/or can be functionalized by several methods. For example, the CNTs may be functionalized by amino groups and/or epoxy groups.

Inorganic nanotubes may be used an alternative or in combination with CNTs. INTs are cylindrical molecules comprised of metal oxides. These INTs can provide high crystallinity, good uniformity and dispersion, needle-like morphology, good adhesion to a number of polymers, and high impact-resistance.

Additionally, silicon carbide whiskers may also be used in addition to CNTs and/or INTs. The silicon carbide whiskers may provide strength. The silicon carbide whiskers may also be functionalized, for example by amino groups and/or epoxy groups.

Graphite fiber may also be added for increased tensile strength. The graphite fiber may help to form a stronger composite or hybrid material into various matrix substrates.

With the nanotubes, they may be dispersed well within the substrate. If the nanotubes are not dispersed well within the substrate and/or are not connected with the polymer matrix of the substrate, the nanotubes may glide within the substrate, which may diminish their ability to enforce the polymer matrix, and/or the healing agent(s) may not be released when a crack(s) is formed. Thus, connecting the nanotubes with the polymer matrix of the substrate can improve its effectiveness in healing the crack(s).

Healing agent(s) inside of the nanotubes may be used to fill the cracks and provide healing to a variety of substrates. The healing agent(s) can provide a permanent means by which a substrate can be repaired. In the present teaching, one or more healing agents may be used inside the nanotubes. For example, molecular isocyanate and/or silylated alcohol may be used. In one example, only one healing agent may be used in a nanotube. Alternatively, more than one healing agent may be used in a nanotube; however, there may be an interaction with another healing agent(s). In order to prevent premature reaction, at least one healing agent may be capped with protective group(s). For instance, a polyol may be protected by trialkyl silyl groups before it is mixed with diisocyanate. The mixture can be stable until it gets contact with water, and silyl groups may then be hydrolyzed fast. The hydroxyl groups may then be exposed, and can react with isocyano groups forming polyurethane.

Each nanotube may contain one type of healing agent or a plurality of healing agents within each nanotube. Further, there may be a mixture of nanotubes in which one type of healing agent can be used inside some nanotubes and at least one other healing agent used inside other nanotubes. Healing agent(s) may include diisocyanates, polyisocyanates, dialcohols, and/or polyalcohols, which can form polyurethanes. Other healing agent(s) may also include diamines and/or glycolcarbonate, which also can form polyurethanes. Other healing agent alternatives can include epoxies and diamines. For example, the healing agent(s) may be aminofunctionalized where amino groups can be on the surface of CNTs that contain diisocyanate which may react with the diisocyanate when the CNTs are filled with the healing agent(s). The healing agents may be chemically protected.

The healing agent(s) may be filled into the nanotubes under vacuum. Using this method, the nanotubes may be placed into a container that can be evacuated. At least one healing agent may then be added such that the nanotube is covered. Once air or some other gas may be allowed into the container, the nanotubes can be filled with the healing agent. The mixture with the nanotubes filled with the healing agent(s) may then be filtered and washed without removing the healing agent(s) from the nanotubes. The filtering and washing may be done using a minimal amount of inert solvent.

Healing agents may be a liquid at the temperature at which they will be used so that they may flow into crack(s) to fill them. The use of an elevated temperature may be possible if the healing agent is a solid at ambient temperature or a solid in the substrate's environment. A healing agent(s) may also be dissolved in inert solvent in order to fill the nanotubes. After the filling, the nanotubes may be capped with the end caps. If the ends of the nanotubes are not capped, the healing agent(s) may leak out prematurely.

After the healing agent(s) can be released from the nanotubes, the healing agent(s) may solidify as a result of at least one reaction. This reaction may be as a result of interactions with water, oxygen, another healing agent(s), and/or another material. If the healing agent(s) do solidify after they are released from the nanotube, the volume of the resulting solid may be advantageously larger than that of the fluid form of the healing agent(s). This larger volume from the resulting solid may aid in filling the crack(s).

Once the healing agent(s) are released, they may then work to heal the crack(s) within the substrate. The healing agent(s) may be released in a variety of ways. First, when a crack is formed, the nanotubes may be cut at the crack site and/or the end caps, which may depend on the width of the end caps, such that the healing agent(s) can be released. Second, the nanotubes containing the healing agent(s) and the bound end caps may undergo a reaction such that the end caps are removed, allowing for the release of the healing agent(s). For the second case, this reaction may be as a result of interactions with water. In order to trigger the mechanism for releasing the healing agent, water may penetrate into the crack(s) of the substrate. For example, if the crack is formed in a humid environment or underwater, some water may penetrate through the cracks and into the nanotubes. Here, silyl groups may be removed by hydrolysis and excess water may be consumed. Then, some water may react with isocyanate compound, releasing carbon dioxide. This carbon dioxide may act to push the healing agent(s) out of the nanotubes. The carbon dioxide can also create bubbles in within the polyurethane formed from the healing agent(s). Also, some hydrolyzed silyl groups may polymerize, forming siloxanes.

After the nanotubes are filled with the healing agent(s), end caps may then be bound onto the ends of the nanotubes. This capping can be done with polymers and/or nanoparticles that may contain multiple amino and/or hydroxyl groups. Some examples of these amino and/or hydroxyl groups may be polyallylamine, polylysine, aminodendrimer, aminofunctionalized polystyrene, and/or polyacrylate nanoparticles. These end caps may be bound with multiple bonds onto both ends of the nanotubes. They can also be on the sidewalls of the nanotubes. Additionally, the polymers and/or nanoparticles can remain free within the composition. If the polymers and/or nanoparticles are free, then they may be able to react with other chemicals within the composition. For example, amino groups may remain free and can bind with epoxy resin if the CNTs can be incorporated into the epoxy. This capping process may be illustrated by FIG. 1.

Additionally, a second functionalization may be done within the composition. For example, second amino functionalized CNTs may be filled with dialcohol and/or polyalcohols that may have amino groups on the surface after the filling process. In another example, polyamino particles may be used to cap the first CNTs may be reacted with diisocyanate, leaving one cyanate group free, and then the polyamino particles can bind with the amino groups at both ends and on the surface of the second CNTs. This reaction is also depicted in FIG. 1.

Along with the composition described herein, other microparticles and/or nanoparticles may also be added. The microparticles and/or nanoparticles may be filled with healing agents. The composition of the nanoparticles may contain metallic nanoparticles such as zinc, aluminum, magnesium, and/or silver. These metallic nanoparticles may provide a passive sacrificial galvanic protection against corrosion. These metallic nanoparticles may also offer electromagnetic interference (EMI) shielding, which may provide "immunity" for electronic components that are susceptible to EMI and prevents the same components from transmitting excessive interference to their surrounding environment.

Figure 2:
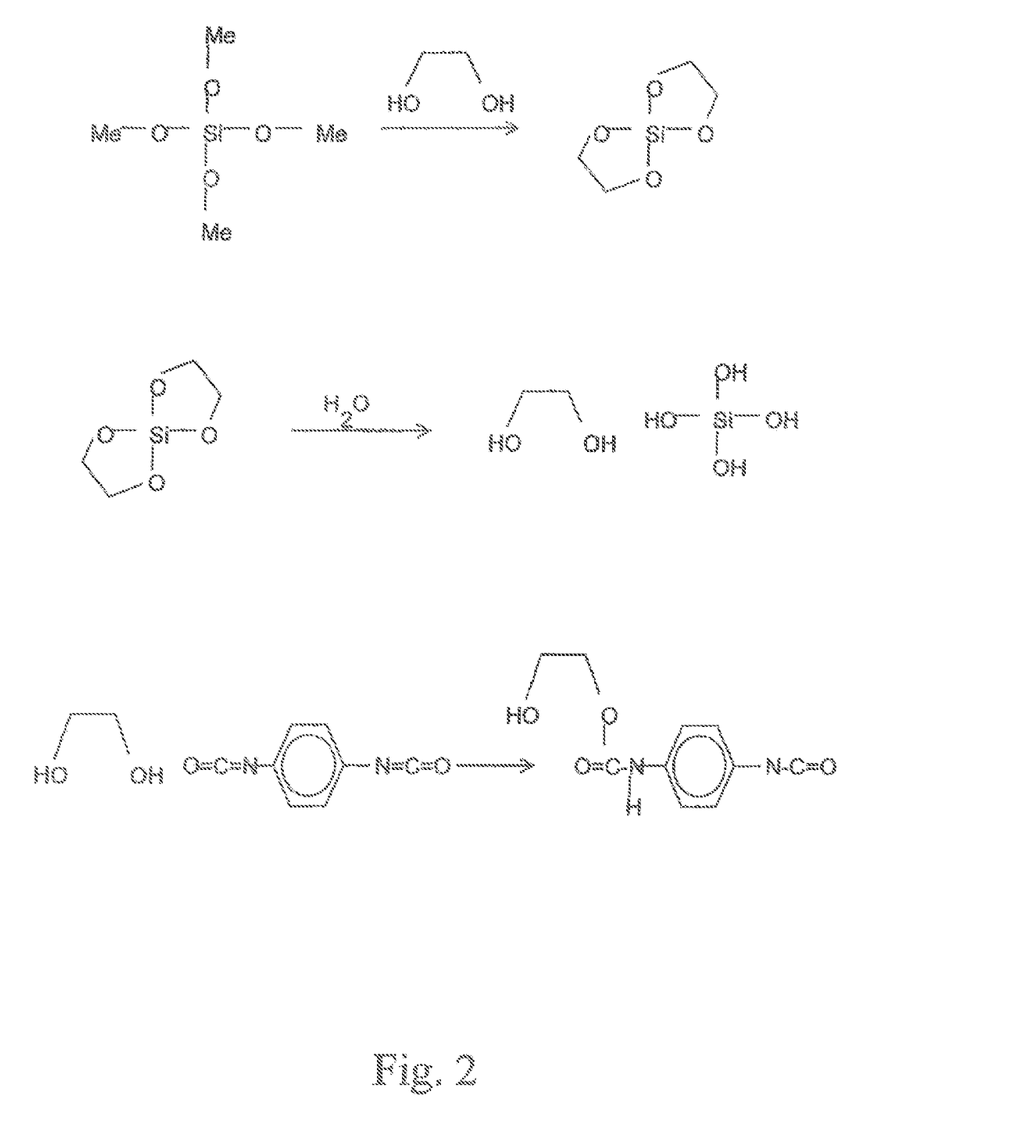
FIG. 2 is a schematic representation of some potential reactions of the present teaching.

FIG. 2 depicts the use of difunctional compounds within the composition. If difunctional compounds are used, then the stoichiometry can be a factor in the length of the polymer chains. If multifunctional monomers are used, then the stoichiometry may not be as critical. For instance, if in a three-dimensional monomer one functional group does not react, or reacts with water, the remaining two functional groups can still form a polymer chain.

However, compositions with more than one healing agent may have healing agents that may leak out at different rates or be unevenly distributed. This may be a desirable property for certain types of compositions. If it is not desired, then it may be prevented, or at least reduced, if one or both of the healing agents is chemically protected, and the protecting group is cleaved by water, oxygen, and/or light. For example, if a polyurethane healing agent is used, then the alcohol may be protected by silyl groups. With the protection from the silyl groups, viscosity may be reduced, miscibility with isocyanate components may be improved, solid polyalcohols can have liquid silyl derivatives, and/or an excess of water can be consumed by the hydrolysis of the silyl groups. For instance, silylated glycerol and/or glucose may be used. Protecting silyl groups may be, as shown in FIG. 2, trimethyl silyl, dimethyl phenyl silyl, and/or methyl ethylenedioxy silyl. These protected polyalcohols may be mixed with isocyanates and filled into the nanotubes. After capping these nanotubes, the composition may be added to a substrate like plastic.

One aspect of the present teachings is the filling of the CNTs with healing agent(s). When a nanocrack is formed, the CNTs may or may not be cut depending on the width of the cap. If the CNTs are not well connected with the polymer, they might glide. In that case they will not be useful for reinforcing the polymer in the first place. Also, the healing agent(s) will not be released when a crack is formed. Thus, connecting the CNTs well with a polymer matrix is one aspect of the present teaching. Healing agent(s) should be fluids at the temperature where the polymer will be used. When the healing agent(s) come out of the CNTs they will solidify as a result of some reaction. Reaction may result from interaction with water, oxygen, or it may happen between two or several healing agents that will be released simultaneously. Advantageously, the volume of the resulting solid material is larger than that of the fluid healing agents.

Currently favored healing agents are di-isocyanates and di- or polyalcohols, which form polyurethanes. If the reaction happens in the presence of water, the volume will increase many fold, because carbon dioxide will be released. Polyurethane contains small bubbles, but it will still form a good barrier against water.

In one aspect, the filling of the CNTs with healing agents happens under vacuum. The CNTs are placed into a container that is evacuated. One healing agent is added so that the CNT will be covered. Air or some other gas is let in, and the CNTs will be completely filled with the healing agent. The mixture is filtered and washed with a minimal amount of inert solvent so that the contents will not be removed. In one aspect, the healing agent is liquid during the process. Use of elevated temperature is possible, if the healing agent is solid at room temperature. The healing agent can also be dissolved into an inert solvent. After filling, the CNTs are capped. Otherwise the healing agent(s) could leak out prematurely.

Figure 3:
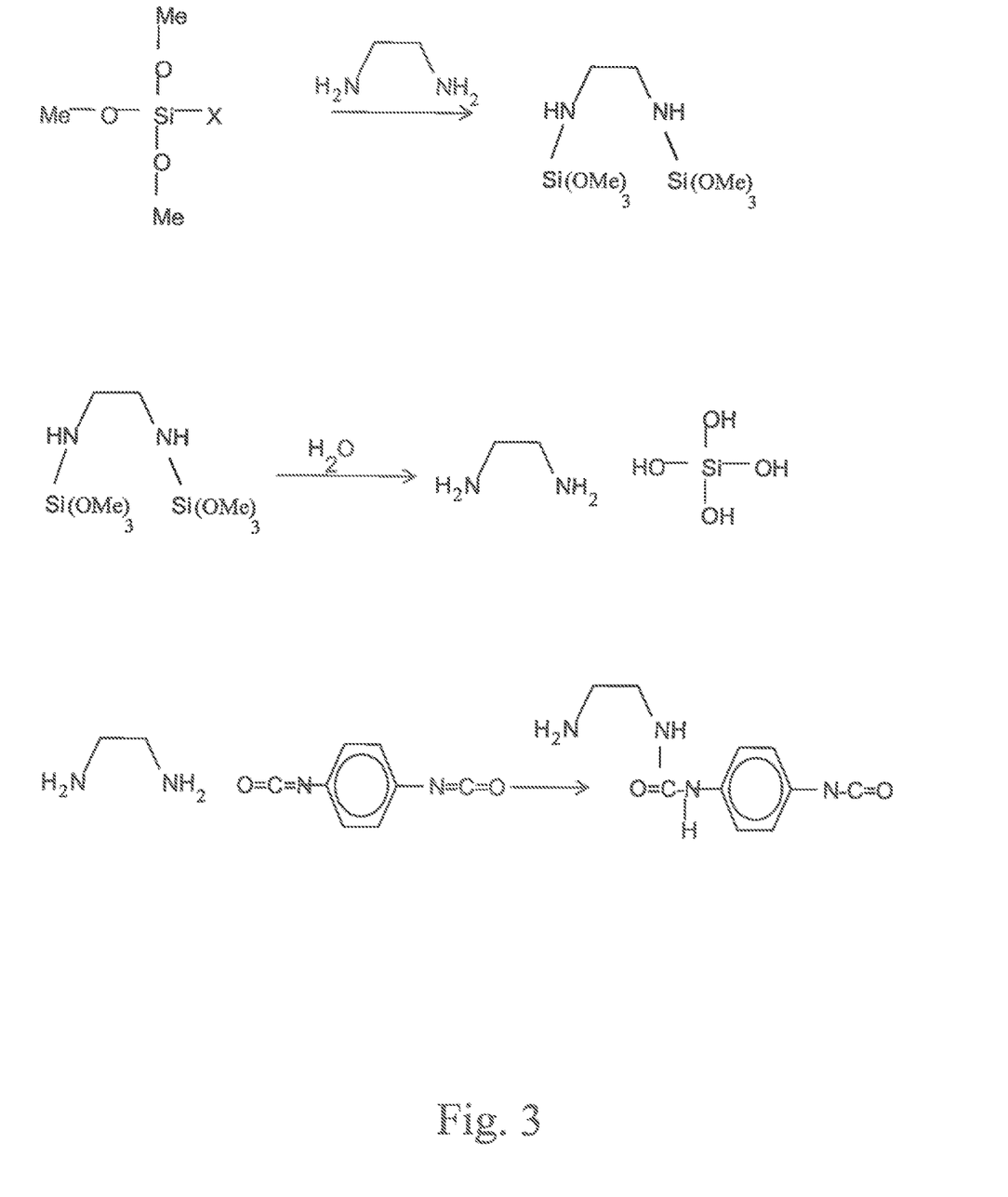
FIG. 3 is a schematic representation of some potential reactions of the present teaching.

As shown in FIG. 3, the first healing agent is di-isocyanate, and the second healing agent is di- or polyamine. The CNTs are advantageously aminofunctionalized. Aminogoups that are on the surface of the first CNTs that contain di-isocyanate will react with di-isocyanate during the filling process. Capping is done with a polymer or nanoparticles that have multiple amino- or hydroxyl groups, such as polyallylamine, polylysine, aminodendrimer, aminofuctionalized polystyrene, or polyacrylate nanoparticles. Capping particles will be bound with multiple bonds onto both ends of the CNTs, and also on the sidewalls. Many amino groups will remain free, and are able to bind with epoxy resin, if the CNTs will be incorporated into epoxy.

After the filling process, the second amino functionalized still have amino groups on the surface. Similar polyamino particles that were used to cap the first CNTs can be reacted with di-isocyanate so that one cyanate group remains free. The particles then bind with amino groups that are at both ends and on the surface of the second CNTs. The capping process of the first and second CNTs is depicted in FIG. 1.

Use of difunctional compounds requires accurate stoichiometry. Otherwise polymer chains will be very short. Use of multifunctional monomers is much more forgiving. For example, if in a three-functional monomer one functional group does not react, or reacts with water, the remaining two functional groups will be enough for the formation of a polymer chain. One problem with a two-component healing composition is that the components may leak out at different rates or be unevenly distributed. This problem can be avoided, if one or both components are chemically protected, and the protecting group is cleaved by water, oxygen, or light. For example, if a polyurethane healing system is used, alcohol or amine may be protected by silyl groups. Silyl protecting has many advantages—viscosity is lowered, miscibility with isocyanate component is improved, solid polyalcohols will have liquid silyl derivatives, and excess water is consumed by hydrolysis of silyl groups. For example, silylated glycerol, glucose, or diaminoethane, or its oligomeric forms may be used. Protecting silyl group may be, for example, trimethyl silyl, dimethyl phenyl silyl, or methyl ethylenedioxy silyl (FIG. 2). The protected polyalcohols may be mixed with isocyanates and the CNTs may be filled with these mixtures. After capping the CNTs, the composition is mixed with plastic.

If a crack is formed in a humid environment, or under water, some water will penetrate inside the CNTs. Silyl groups will be removed by hydrolysis, and excess water will be consumed. Some water will react with the isocyanate compound, and carbon dioxide will be released. Carbon dioxide will push the mixture out of the CNT, and also create bubbles in the polyurethane. Some hydrolyzed silyl groups will be able to polymerize on their own, forming siloxanes. The functional groups can also be on the surface of the nanoparticles. In one aspect, the nanoparticles are small enough to fit inside of the CNTs, and the molecular isocyanate, silylated alcohol, or amine are inside the CNTs. Nanoparticles will fill most of the space inside a crack, while molecular components will create a final seal.

Many other kinds of nanoparticles may be used. Most notably, the composition may contain metallic nanoparticles, such as zinc, aluminum, magnesium, or silver. These metal particles may give passive sacrificial galvanic protection against corrosion. They will also provide EMI shielding properties for the self-healing area.

These filled CNTs can be used to reinforce many plastics and other materials, including rubber, ceramics, metals, and concrete. Plastics can be thermoset or thermoplastics. Material can be structural or used for coating. Epoxies, polyurethanes, and polyureas are examples. These can be used in demanding coatings, such as oil pipes, chemical containers, and marine applications. Coating formulations may contain sacrificial metal particles, such as zinc or nickel, as anticorrosive agents.

Also other encapsulating methods than CNTs may be used in the context of the present teaching.

While this present teaching has been described in detail with reference to certain examples and illustrations of the present teaching, it should be appreciated that the present teaching is not limited to the precise examples. Rather, in view of the present disclosure, many modifications and variations would present themselves to those skilled in the art without departing from the scope and spirit of this present teaching. The examples provided are set forth to aid in an understanding of the present teaching but are not intended to, and should not be construed to, limit in any way the present teaching.

Example 1

Two moles ethylene glycol and one mole of tetramethyl silicate were heated first under reflux at 60° C., and then in a distillation apparatus until no methanol was recovered. Two moles of 1,4-phenylene di-isocyanate was added. 100 ml of the mixture was added slowly onto 50 g of amino-CNTs under vacuum. The mixture was filtered using suction. Half of the amino groups in 16-aminodendrimer were reacted with butanoyl anhydride. The product was dissolved into butyl propionate, and dry ice cooled (about −50° C.). Filled CNTs were added slowly mixing very well. The mixture was filtered with suction and the product was mixed immediately with the diglycidyl ether of bisphenol A.

Non-limiting aspects have been described, hereinabove. It will be apparent to those skilled in the art that the above methods and apparatuses may incorporate changes and modifications without departing from the general scope of the present subject matter. It is intended to include all such modifications and alterations in so far as they come within the scope of the appended claims or the equivalents thereof.

Having thus described the present teachings, it is now claimed:

1. A method for sealing cracks in an associated substrate using a self-healing polymer, the method comprising the steps of:
 filling at least a first carbon nanotube (FCN) with at least a first healing agent, wherein the at least a FCN has first and second ends;
 closing a first FCN end cap on the first end of the at least a FCN;
 closing a second FCN end cap on the second end of the at least a FCN;
 filling at least a second carbon nanotube (SCN) with at least a second healing agent, wherein the at least a SCN has first and second ends;
 closing a first SCN end cap on the first end of the at least a SCN;

closing a second SCN end cap on the second end of the at least a SCN; and releasing the at least a first healing agent and the at least a second healing agent from the FCN and the SCN for filling cracks in the associated substrate, wherein the first FCN end cap, the second FCN end cap, the first SCN end cap, and the second SCN end cap are capable of being removed by hydrolysis.

2. The method of claim 1, wherein the at least a first healing agent is at least two first healing agents, wherein at least a second healing agent is at least two second healing agents, wherein at least two of a combination of the at least two first healing agents and the at least two second healing agents are different.

3. The method of claim 2, wherein one of the at least two first healing agents is an amine and one of the at least two first healing agents is an isocyanate, wherein a functional group of the amine is chemically protected by a silyl group, wherein the silyl group is capable of being removed by hydrolysis.

4. The method of claim 3, wherein the isocyanate is a diisocyanate or a polyisocyanate, and the polyamine is a diamine or a polyamine.

5. The method of claim 3, wherein the silyl group is chosen from the group consisting of trimethyl silyl, dimethyl phenyl silyl, and methyl ethylenedioxy silyl.

6. The method of claim 1, wherein the at least a first healing agent and the at least a second healing agent are chosen from the group consisting of molecular isocyanate, silylated alcohol, and amine.

7. The method of claim 1, wherein the at least a FCN and the at least a SCN are at least one layer of a single walled layer, a double walled layer, and a multiwalled layer.

8. The method of claim 7, wherein the at least a FCN and the at least a SCN are functionalized.

9. The method of claim 8, wherein the first and second FCN end caps and the first and second SCN end caps are polymers or nanoparticles.

10. A method for sealing cracks in an associated substrate using a self-healing polymer, the method comprising the steps of:

filling at least a first carbon nanotube (FCN) with at least a first healing agent, wherein the at least a FCN has first and second ends;

closing a first FCN end cap on the first end of the at least a FCN;

closing a second FCN end cap on the second end of the at least a FCN;

filling at least a second carbon nanotube (SCN) with at, least a second healing agent, wherein the at least a SCN has first and second ends;

closing a first SCN end cap on the first end of the at least a SCN;

closing a second SCN end cap on the second end of the at least a SCN; and releasing the at least a first healing, agent and the at least a second healing agent from the FCN and the SCN for filling cracks in, the associated substrate, wherein the at least a FCN and the at least a SCN are functionalized.

11. The method of claim 10, wherein the first and second FCN end caps and the first and second SCN end caps are polymers or nanoparticles.

12. The method of claim 11, wherein the first FCN end cap, the second FCN end cap, the first SCN end cap, and the second SCN end cap are capable of being removed by hydrolysis.

13. The method of claim 10, wherein at least a first healing agent is at least two first healing agents, wherein one of the at least two first healing agents is an amine and one of the at least two first healing agents is an isocyanate, wherein a functional group of the amine is chemically protected by a silyl group, wherein the silyl group is capable of being removed by hydrolysis.

14. A method for sealing cracks in an associated substrate using a self-healing polymer, the method comprising the steps of:

filling at least a first carbon nanotube (FCN) with at least a first healing agent, wherein the at least a FCN has first and second ends;

closing a first FCN end cap on the first end of the at least a FCN;

closing a second FCN end cap on the second end of the at least a FCN;

filling at least a second carbon nanotube (SCN) with at least a second healing agent, wherein the at least a SCN has first and second ends;

closing a first SCN end cap on the first end of the at least a SCN;

closing a second SCN end cap on the second end of the at least a SCN; and releasing the at least a first healing agent and the at least a second healing agent from the FCN and the SCN for filling cracks in the associated substrate, wherein the first and second FCN end caps and the first and second SCN end caps are polymers or nanoparticles.

15. The method of claim 14, wherein the first FCN end cap, the second FCN end cap, the first SCN end cap, and the second SCN end cap comprise at least one chemical of polyallylamine, polylysine, aminodendrimer, aminofunctionalized polystyrene, and polyacrylate nanoparticles.

16. The method of claim 14, wherein one of the at least two first healing agents is an amine and one of the at least two first healing agents is an isocyanate, wherein a functional group of the amine is chemically protected by a silyl group, wherein the silyl group is capable of being removed by hydrolysis.

17. The method of claim 16, wherein the nanoparticles comprise at least one metal of zinc, aluminum, magnesium, and silver.

18. The method of claim 17, wherein the at least a FCN and the at least a SCN are functionalized.

19. The method of claim 18, wherein the first FCN end cap, the second FCN end cap, the first SCN end cap, and the second SCN end cap are capable of being removed by hydrolysis.

* * * * *